Patented Jan. 30, 1945

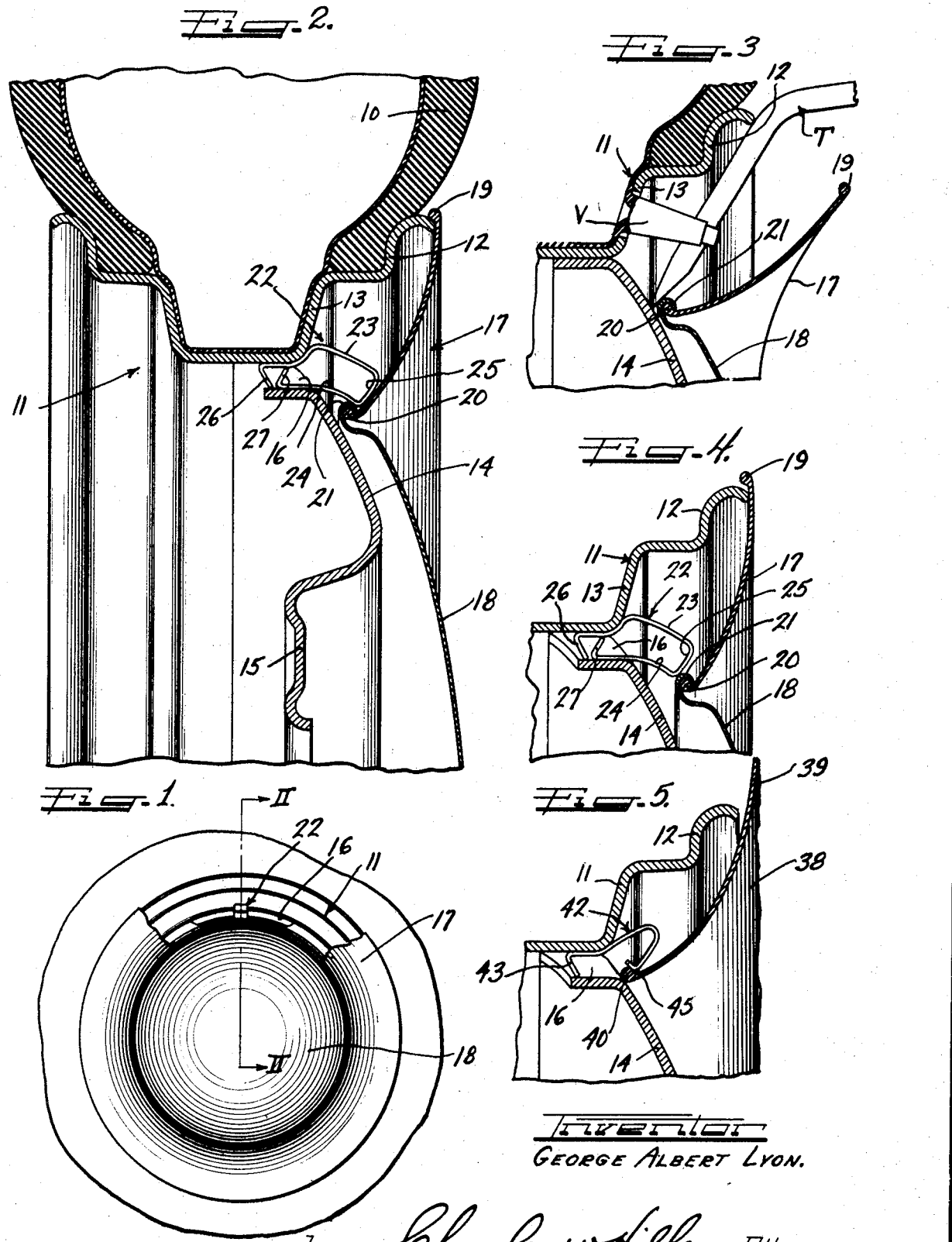

2,368,240

UNITED STATES PATENT OFFICE 2,368,240

WHEEL CONSTRUCTION

George Albert Lyon, Allenhurst, N. J.

Application February 25, 1943, Serial No. 477,001

4 Claims. (Cl. 301—37)

This invention relates to an automobile wheel structure and more particularly to a highly flexible circular wheel trim member formed for ready attachment to and detachment from the wheel and being flexible when in use on the wheel to permit of access to the rear thereof.

An object of this invention is to provide, in a wheel structure, an improved trim member which will readily blend in with the outer side contour of the tire and which may be flexed on the wheel without necessitating removal of the trim member from the wheel for the purpose of enabling access to the valve stem, removal of the trim member, and other useful purposes.

In accordance with the general features of this invention, there is provided, in a wheel structure including a drop center type of flange tire rim having a tire thereon, a circular wheel trim member having resilient flexible characteristics such as that of rubber, synthetic plastic, and very thin, springy metal, and of such cross-sectional contour as to extend over an outer side of the flanges of the tire rim, the outer margin of the trim member being readily manually flexible in the use of the wheel, and an inner portion of the trim member being provided with means for retaining it on the wheel in a position such that the outer portion of the trim member may be flexed when desired or necessary in the use of the wheel assembly.

Still another feature of the invention relates to the provision of a trim member of the aforementioned characteristics with a reinforced marginal edge portion such as to give the ring sufficient rigidity to maintain its circular contour but which does not detract from the transverse resiliently flexible characteristics of the member.

Still another feature of the invention relates to the provision of a trim structure which is adapted to have a central disk simulating a hub cap connected to an inner margin thereof and which can be removed with the trim member as a single unit.

A further feature of the invention relates to the provision of a trim member and disk combination of the aforementioned characteristics and wherein the joint is utilized as a shoulder for cooperation with retaining means on the wheel to which the trim member is applied.

Other objects and features of this invention will more fully appear from the following detailed description taken in connection with the accompanying drawing which illustrates several embodiments thereof and in which:

Figure 1 is a fragmentary side elevation of my novel wheel trim showing it applied to a wheel, the tire being broken away and also a portion of the trim member being broken away to show the position of one of the retaining springs for cooperation therewith.

Figure 2 is an enlarged fragmentary cross-sectional view taken on line II—II of Figure 1 looking in the direction indicated by the arrows and showing my novel wheel trim retained in position by spring means.

Figure 3 is a fragmentary cross-sectional view similar to Figure 2 illustrating how a portion of the circular trim member may be flexed to afford access to the rear side thereof for the purpose of getting at the valve stem and the like;

Figure 4 is a fragmentary cross-sectional view similar to Figure 3 showing my novel trim member in the process of being applied to the wheel just prior to the pressing of it home into retained cooperation with the spring means; and Figure 5 is a fragmentary cross-sectional view similar to Figure 2 showing a modification of the invention wherein the trim member does not have a central hub cap-like disk attached thereto and wherein the outer peripheral portion of the trim member is adapted to overlie and intersect the outer sidewall of the tire, the tire being omitted but it being understood that it would look the same as shown in Figure 2.

In the drawing:

The reference character 10 designates generally a conventional pneumatic tire having the usual beads adapted to seat in a conventional type of drop-center rim designated generally by the reference character 11. This rim, as is well known, embodies a multiple of side flanges such as the side flanges 12 and 13. Attached to the base of the rim at spaced intervals, which as is well known in the art may be at four points, is a wheel spider 14. This wheel spider or body part 14, as is also well known in the art, has a central flange 15 by means of which the wheel may be bolted in the usual way on an axle or a support in an automobile or the like. As noted before, the outer portion of this wheel body or spider 14 is attached at spaced points to the base of the rim and between the places of attachment are openings 16 (Figures 1 and 2) which, in accordance with the teachings of this invention, are utilized to accommodate springs for retaining my novel wheel trim on the wheel.

The present invention is directed to the provision of an ornamental useful wheel trim for concealing the outer side flanges 12 and 13 of the tire rim 11 and may take a number of different forms as best shown in Figures 2 and 5. In the preferred form of the invention as shown in Figures 1 to 4 the trim member, as designated generally by the reference character 17, carries a central hub-cap simulating disk 18, whereas in the modification of the invention shown in Figure 5 the central hub cap disk is dispensed with.

Heretofore, in metal trim rings, it has been necessary to so construct the ring that the valve stem could project through a slot or opening thereof for the purpose of affording access to the valve stem. As a consequence, it has not been feasible heretofore to give the trim ring such a contour as would cause it to blend more symmetrically with the outer contour of the side wall of the tire, so as to appear as a continuation of that side wall. I aim, in accordance with the provisions of this invention, to provide a trim ring which is of such structural characteristics that it may normally completely or substantially conceal the valve stem and thus it is possible to provide the trim ring with the desired cross-sectional contour. The reason I am able to accomplish this is by reason of the use of a resiliently flexible material in the trim member 17 which permits of it being flexed manually away from the rim as shown in Figure 3.

I have obtained excellent results by making the trim member 17 of a synthetic plastic material such, for example, as cellulose acetate, although excellent results may likewise be obtained by the use of rubber. It is also contemplated that it may be feasible to obtain sufficiently thin, springy metallic material that a trim member made of the same could be manually flexed to a sufficient extent for the purpose herein disclosed without permanently distorting the trim member.

It will be perceived that the trim member 17 is of a convex-concave cross-sectional shape and is in the form of a continuous annular ring having inner and outer marginal edges. The outer edge is reinforced by a beading 19 and the inner edge may likewise be reinforced with a beading 20. These reinforcements are such as to tend to hold the ring in the desired contour but still do not interfere with the transverse flexing of the ring to the position shown in Figure 3, wherein access may be had to the valve stem V of the tire and wherein access may be had to the inner marginal portion of the ring or member 17 for the purpose of prying it loose from the wheel, as will be described more in detail hereinafter, with a tool T.

The bead 20 may, if it is so desired, be interlocked with the central hub cap-simulating disk 18 which may be made of metal or any other suitable material. The interlock is effected by curling the outer marginal portion 21 of the disk 18 about the inner surface of the beaded edge 20 as is clearly shown in cross-sectional view. This provides a reinforced rearwardly extending shoulder which is cooperable with a plurality of identical retaining spring elements or clips designated generally by the reference character 22. These clips may be of any suitable number, although, if the wheel has four openings 16, it is desirable to use four of these clips, one being disposed in each of the openings as shown in Figure 1.

The spring clip 22 includes two opposite leg portions 23 and 24 joined by a looped end 25. The free end of the leg 23 is turned obliquely and radially inwardly to form a slanting portion 26 and the free end of the leg 24 is inclined radially outwardly as indicated at 27. The extremity of the inclined leg 26 is adapted to resiliently bite the wheel spider 14 inside of the wheel opening, and similarly the leg 27 is adapted to bite the base of the rim 11. The two retaining extremities 26 and 27 may be laterally offset so that they are free to be pressed into resilient retaining cooperation with the opposite parts of the wheel defining the sides of the opening 16. In use, the extremities of the clips are pressed axially inwardly into the opening 16 until they have firmly engaged the operating parts of the wheel for the purpose of holding the clips in position.

The resilient outer loop portion 25 of each of the clips is adapted to resiliently engage the shoulder at the junction of the member 17 and disk 18 for the purpose of holding the trim assembly on the wheel. In the application of the assembly the same is pressed axially toward the wheel body until the loop portions 25 of the clips are snapped behind the curled shoulder 21 into retaining cooperation therewith. This provides an easy-on-hard-off snap connection between the wheel trim assembly and the wheel.

Also, in the application of the trim assembly to the wheel, the trim member 17 is placed under stress. The manner in which this is done is illustrated in Figures 4 and 2. In Figure 4, the normal contour of the trim member 17 is shown. In the position illustrated, the outer margin of the trim member 17 is bearing against the outer edge of the side flange 12 and the inner margin of the trim member is in a position bearing on the spring clip but just prior to the time that the wheel trim of the cover is snapped home into retained position. It will be clear from Figure 4 that the further pressing of the trim assembly axially inwardly will result in the stressing of the trim member 17 to the position shown in Figure 2 and, as a consequence, the outer bead 19 is caused to have tight stressed engagement with the outer turned edge of the tire rim flange 12. This is desirable since it enables not only a tight connection of the trim member at its place of engagement with the spring clips, but also enables the outer margin of the trim member to be firmly held against the wheel.

Since the modification shown in Figure 5 also has operational characteristics common to the preferred form, I shall first describe Figure 5 before proceeding with the description of the operation and use of the device. In Figure 5 a modified form of trim member 38 is illustrated. This trim member is in the form of an annulus and does not carry a central disk such as the disk 18. The inner marginal edge of the trim member is reinforced by a bead 40. The outer marginal portion of the trim member extends beyond the side flange 12 of the trim member 11 and is formed into a lip portion 39 which is adapted to overlie and tightly intersect the outer sidewall of the tire so as to blend in and appear as a continuation of the outer sidewall.

A slightly different form of spring clip 42 is illustrated for holding the trim member 38 in place. Four of these clips may be used if so desired and, since they are all identical, a description of one will suffice for all.

The clip 42 is of an angular construction and, like the clip 22, may be made of any suitable spring material such as spring steel. It has two converging leg portions 43 and 44 which converge radially in the direction of the axis of the wheel. The inclined leg portion 43 is adapted to have a biting engagement with the body of the wheel when the same is pressed bodily into the wheel opening. The leg portion 44 is in the form of a gooseneck and has a turned extremity 45. This turned extremity 45 is adapted to resiliently retainingly cooperate with the ribs or shoulder 40 on the inner margin of the trim member 38 when the trim member is pressed axially home into retaining cooperation with the spring clip. It will be noted that, in this form of the spring clip, as in the case of the clip 22, the intermediate portion of the clip engages the rounded portion of the base of the tire rim so as to be backed up by the tire rim. Also, as in the preferred form, the resilient outermost portion of the clip is adapted to resiliently yield as the shoulder on the trim member is pressed thereover and therebehind into retaining cooperation therewith.

It will be perceived that in both forms of the invention, the natural elasticity of the rubber-like trim member 17—38 permits of that member being elastically distorted for the purpose of moving it to a position such as shown in Figure 3 without the material of the member taking a permanent set. In other words, after it is released, the member is free to spring back to its original shape on the wheel.

Moreover the cross-sectional contour, location and arrangement of the trim member is such that it appears in use to be in effect a continuation of the sidewall of the tire. Hence if such a trim member is given an external finish, such as an eggshell white, it will cause the ensuing tire to appear to have a white sidewall. Then, too, in the Figure 5 modification, the flexible lip portion 39 on the trim member 38 permits of the member breathing with the tire as the tire flexes in and out in use while it is running over a road.

The operation of applying each of these trim members to the wheel has already been described. In removing either of these trim members from the wheel, the member is first flexed to a position such as shown in Figure 3 at which time a pry-off tool T may be inserted behind the curled lip 21 and pressure applied for the purpose of prying it free from its retained engagement with the resilient spring clips on the wheel.

In the first form of the invention, the junction of the elastic trim member 17 with the central disk 18 provides a reinforcing and rigidifying shoulder for the trim member which aids in the maintenance of the normal arcuate contour of the member. In the Figure 5 modification the beaded edge 40 on the inner periphery of the annular trim member 38 is adapted to abut against the wheel spider so that the spider constitutes a backing for the trim member.

In the first form of the invention, should the unit comprising the members 17 and 18 be dropped on the ground in the act of applying or removing it from the wheel, the outer rubber or plastic ring 17 will act as a cushioning medium for preventing damage to the central metal disk 18. If it is so desired, the central metal disk 18 could be made of rubber or plastic, but I have obtained excellent results by making it of relatively thin metal since it permits of a lustrous finish which contrasts admirably with the finish on the trim ring member 17.

It is of course to be understood that the trim member in either of the forms of the invention is flexible not only to permit access to the valve stem for the purpose of introducing air into the tire as well as to permit the introduction of a pry-off tool T as shown in Figure 3, but in addition permits of the application of well known wheel balance weights to the flanges of the wheel 11.

A further advantage of the trim ring 17—38 resides in the fact that when it is used to conceal the valve steam V, it aids in preventing unauthorized access to or tampering with the valve stem, also either form may have a central disk 18 and a lip 39 as desired without departing from my invention.

I claim as follows:

1. In a wheel structure including a drop-center type of flanged tire rim having a tire thereon, a circular wheel trim member having resilient flexible characteristics such as that of synthetic plastic and of such cross-sectional contour as to substantially cover an outer side of the flanged tire rim, a central disk simulating a hub cap connected to the inner margin of said trim member, said trim member being elastically flexible relative to the flanges of the tire rim to permit access to the tire valve stem and to permit of removal of the member from the wheel, and spring clips cooperable with the junction of said trim member and central disk for detachably retaining the same on a wheel, each of said spring clips comprising a flexible portion adapted to be inserted in an opening in the body of the wheel for retaining cooperation with the wheel and a flexible outer portion cooperable with the junction of the trim member and central disk.

2. In a wheel structure including a drop-center type of flanged tire rim having a tire thereon, a circular wheel trim member having resilient flexible characteristics such as that of synthetic plastic and of such cross-sectional contour as to substantially cover an outer side of the flanged tire rim, a central disk simulating a hub cap connected to the inner margin of said trim member, said trim member being elastically flexible relative to the flanges of the tire rim to permit access to the tire valve stem and to permit of removal of the member from the wheel, and spring clip means cooperable with the junction of said trim member and central disk for detachably retaining the same on a wheel, said junction being formed by curling an outer edge of said disk over a reinforced inner edge of the trim member to interlock the two together.

3. The structure of claim 2 further characterized by the spring clips retainingly cooperating with the tire rim to the rear of said trim member and by the junction of said trim member and disk being accessible for engagement by a pry off tool inserted behind the trim member.

4. In a wheel structure including a tire carrying rim, a circular wheel trim member having resilient flexible characteristics such as that of synthetic plastic and of such cross-sectional contour as to substantially cover an outer side of the rim, a central cover member radially inward of and connected to said trim member, with the junction of said members adjacent said rim, said trim member being manually deflectable relative to said junction to afford access to the junction, and spring clip means cooperating with said rim and said members to detachably retain said members on said wheel.

GEORGE ALBERT LYON.